United States Patent [19]
Geary

[11] 3,741,638
[45] June 26, 1973

[54] VISUAL SIMULATION
[75] Inventor: Michael Edward Geary, Aylesbury, England
[73] Assignee: Redifon Air Trainers Limited, Aylesbury, England
[22] Filed: Oct. 20, 1970
[21] Appl. No.: 82,425

Related U.S. Application Data
[63] Continuation-in-part of Ser. No. 710,603, March 5, 1968, abandoned.

[52] U.S. Cl. ................ 353/122, 35/12 N, 350/125, 353/11, 353/80
[51] Int. Cl. ......................................... G03b 21/00
[58] Field of Search ....................... 350/125; 353/11, 353/12, 13, 80, 122; 35/12 N

[56] References Cited
UNITED STATES PATENTS
2,999,322  9/1961  Hemstreet............................ 350/125
2,938,279  5/1960  Hemstreet et al. ................. 353/11 X

FOREIGN PATENTS OR APPLICATIONS
201,131  10/1967  U.S.S.R................................ 35/12 N

*Primary Examiner*—William D. Martin, Jr.
*Attorney*—Dowell & Dowell

[57] ABSTRACT

The shadowgraph visual simulation system, for a land vehicle simulator, includes a three-dimensional model of terrain; and a light source mounted at a fixed height within the boundaries of the model and able to change its relative position within the model boundaries in accordance with supposed changes of the position therein of the vehicle simulated. An upright translucent viewing screen is mounted at one side of the model and on to one side of this the light source projects a changing picture of the model scene. An observation station for a vehicle trainee is provided on the side of the screen opposite to the model and light source, wherein the point of observation of the trainee is low in relation to the screen height and the upper part of the screen is vertical and flat while the lower part curves progressively out of the vertical in the direction away from the model and light source, with the vertical upper part of the screen blending into the non-vertical lower part in a smooth curve at the "horizon" line of the picture on the screen, thereby improving the perspective for the case where the "viewpoint" represented by the light source is too high in relation to the model.

1 Claim, 3 Drawing Figures

Inventor
Michael Edward Geary

VISUAL SIMULATION

This invention relates to visual simulation such as is employed, for example, in vehicle driving trainers. The present application is a Continuation-in-part of my earlier application Ser. No. 710,603 filed Mar. 5, 1968, now abandoned.

To give to a trainee vehicle driver the impression of travel in a simulated vehicle, a picture is projected on to a screen in front of him displaying a scene into which he appears to be moving and which changes in a manner appropriate to operation by the trainee of simulated vehicle controls. For creating this appropriately changing picture a visual model can be employed, for instance a model road system in the case of a road vehicle simulator, with arrangements whereby the model scene as observed from a particular "viewpoint" is projected on to the screen and the position and viewing direction of that view point in relation to the model is made to change in correspondance with the supposed travel of the vehicle. One of the known ways of achieving such a result is by employing the so-called shadowgraph technique.

In the shadowgraph technique, the "viewpoint" is represented by a light source, i.e., a lamp bulb filament, which changes its relative position within the boundaries of the model. Usually, it is most convenient for the light source to remain stationary and the model to shift and turn in relation to it. Considering now the particular case of a road vehicle simulator, the light source is mounted a certain distance above the model roadway and the perspective of the shadowgraph picture formed on the screen depends on this distance. If the light source is very close to the "road" surface of the model then the perspective will be such that the observer will also feel close to the road. And if the light source is some considerable distance above the model then the perspective will be such that the observer will feel himself to be suspended high above the road. The perspective also depends on the scale of the model. Thus, for a given height of light source the smaller the model the higher the observer will appear to be. Consequently, for a correct impression very small models call for the light source to be very close to the model surface. However, this is not always easy to achieve because of the size of the lamp envelope and the heat generated by the filament. It is an object of the invention to meet this difficulty.

According to the present invention, the viewing screen is bent or shaped so as to improve the perspective for the case where the "viewpoint" represented by the light source is too high in relation to the model. The screen is made flat above the horizon but below this it is bent away from the light source. As a result, generally vertical objects in the model, such as telegraph poles and trees, which stand above the horizon appear vertical, while below the horizon there is deliberate distortion in the form of extra magnification which widens the perspective towards the observer. This helps to correct for the fact that the lamp bulb is too far from the surface of the model.

One way of carrying the invention into effect is illustrated by way of example in the accompanying drawings in which.

Figure 1:
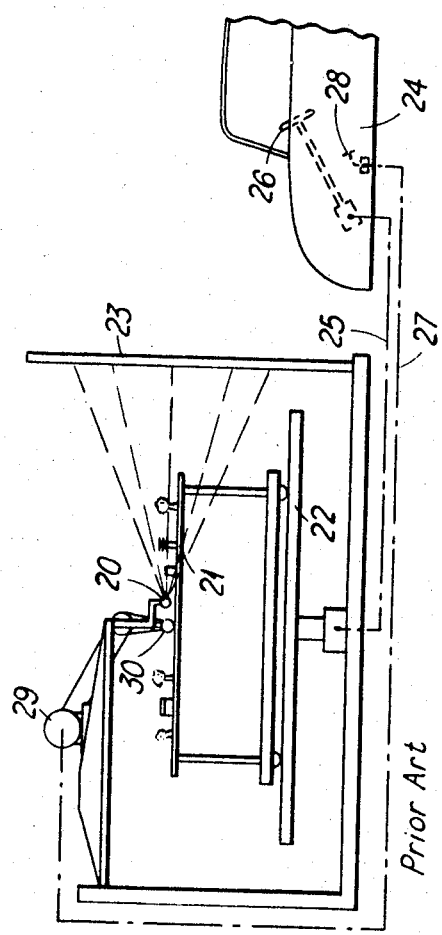
FIG. 1 is a diagram illustrating, in elevational view, a prior art road vehicle simulator of the shadowgraph type to which the invention is applicable.

Referring firstly to FIG. 1, this illustrates the well known prior art shadowgraph arrangement for simulating the view observed by a vehicle driver through the windowscreen of a simulated road vehicle 24. A lamp bulb 20 is mounted within the boundaries of a three-dimensional model 21 of a road system and associated objects, which model is carried on a base 22 so as to be capable of shifting and turning in relation to the lamp bulb in accordance with the supposed movements of the vehicle simulated. The means for moving the model are well known to those skilled in the shadowgraph simulation art and therefore have not been illustrated in detail. There is merely indicated diagrammatically an operative connection 25 between the steering wheel 26 of the simulated vehicle 24 and the turntable base 22; and a further connection 27 between the throttle pedal 28 of the simulated vehicle 24 and a motor 29 driving a friction drive wheel 30 in contact with the model 21 for moving it over the turntable. The light from the lamp bulb casts a shadow of the model scene onto a flat vertical translucent viewing screen 23 which is observed from the opposite side of the screen by a trainee vehicle driver situated at the trainee driver's station 24.

The lamp bulb filament represents the "viewpoint" of the observer within the model scene and therefore, in order to preserve scale, the lamp bulb is mounted at a fixed height as close to the model "road" surface as is practicable. However, the closeness with which the lamp filament can approach the model surface is clearly limited by the size of the lamp bulb envelope. In practice, it has been impossible to place the lamp bulb filament close enough to the model surface to obtain entirely realistic simulation without making the model considerably larger than it otherwise needs to be. However, the problem involved in using a small model can be solved by substituting for the flat vertical prior art type screen 23 the improved viewing screen according to the present invention.

Figure 2:
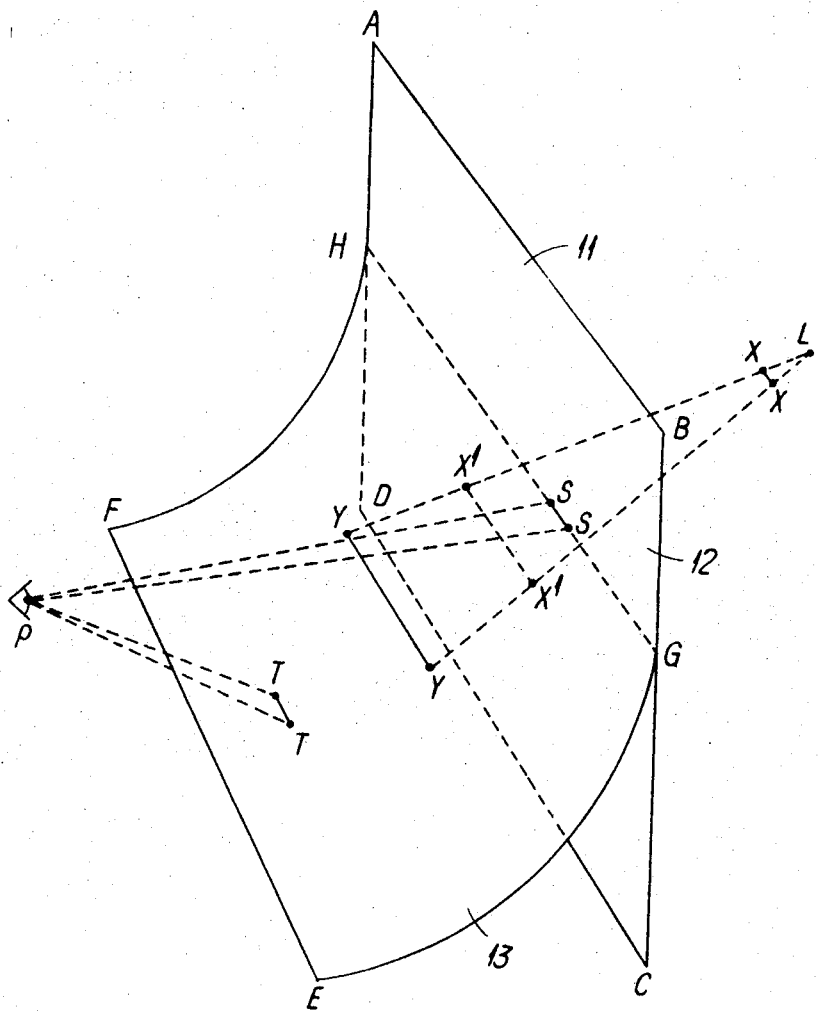
FIG. 2 is a pictorial diagram of a viewing screen according to the invention which is to be substituted for the flat vertical screen of the FIG. 1 prior art arrangement.
Figure 3:
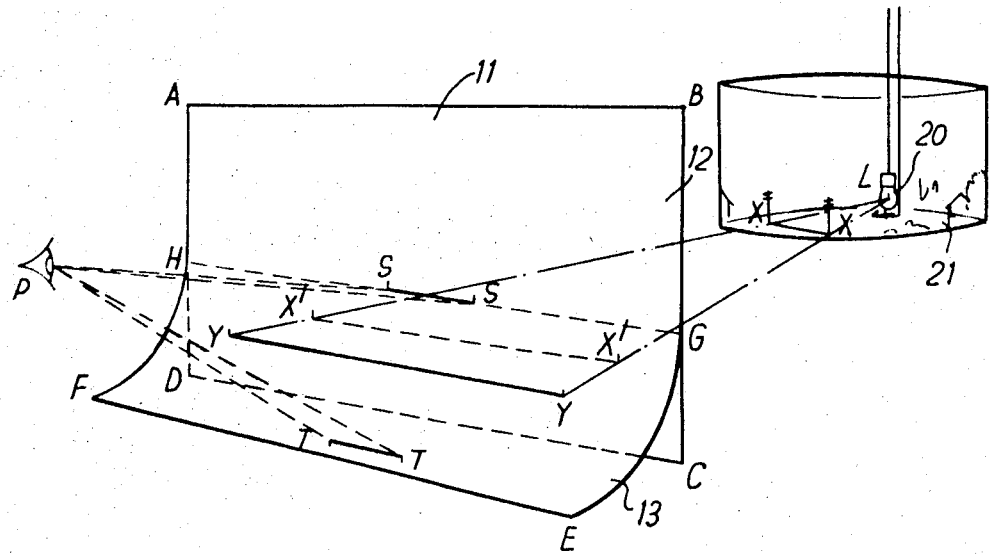
FIG. 3 is a perspective view of the combination of the three-dimensional model arrangement and the curved upright screen shown in FIGS. 1 and 2.

FIG. 2 of the drawings shows the improved screen 11 and illustrates the optical effects associated with it. The screen 11 consists of a sheet of translucent synthetic plastic material mounted in the field of view of the observer P and having a flat upper portion 12 disposed vertically in a plane ABCD and a lower portion 13 which is bent or curved toward the observer so that the lower edge EF of the screen is nearer to the observer P than the vertical portion 12. The shadowgraph picture is then projected onto this screen from the rear, the arrangement being such that the bottom of the vertical portion 12 of the screen meets the bent or curved lower portion 13 in a horizontal line GH that lies where the horizon is in the picture of the model scene that appears on the screen. The lower portion 13 of the screen preferably blends into the vertical portion 12 in a smooth curve.

If an object xx is projected by a lamp L into the flat vertical plane ABCD then it will have length $x' - x'$. If however, the screen is curved as at ABEF, this length will increase to yy (i.e., there will be greater magnification). Objects below xx will receive even greater magnification, and objects above xx will receive less magnification. The magnification therefore increases steadily from the horizon line GH towards the bottom of the picture. This changes the perspective of, say, a road scene on the screen, in such a way as to make an observer feel closer to the road.

This effect, however, depends greatly upon the point of observation P, and the higher this is, the less advantage can be gained. In addition, an observer at point P viewing an object SS at the "horizon" and an object TT in the "foreground" will gain a further change in perspective, due to the different actual distances of the two objects on the screen. This follows from the fact that, due to the screen curvature, the object TT will subtend a larger angle at P than the object SS, although it is the same size as the object SS.

Providing the point of observation is reasonably low, the overall effect is therefore that the roadway and near objects appearing on the curved lower portion of the screen, and therefore being farther from the light source, are magnified to an increasing extent as the point of observation is approached, whereas distant objects on the horizon appear on the vertical portion of the screen and are undistorted. The observer consequently has the impression that the simulated "viewpoint", represented by the light source, is closer to the model surface than it actually is.

I claim:

1. A shadowgraph visual simulation system for a land vehicle simulator, comprising a three-dimensional model of terrain, a light source mounted at a fixed height and to change its relative position within the boundaries of the model in accordance with supposed changes of the position therein of the vehicle simulated, an upright translucent viewing screen mounted at one side of the model and on to one side of which the light source projects a changing picture of the model scene, and an observation station for a vehicle trainee on the side of the screen opposite to the model and light source, and wherein the point of observation of the trainee is low in relation to the screen height and the upper part of the screen is vertical and flat while the lower part curves progressively out of the vertical in the direction away from the model and light source, with the vertical upper part of the screen blending into the non-vertical lower part in a smooth curve at the horizon line of the picture on the screen, thereby improving the perspective for the case where the viewpoint represented by the light source is too high in relation to the model.

* * * * *